United States Patent [19]

Chow

[11] 4,145,242

[45] Mar. 20, 1979

[54] WOOD TREATMENT FOR PRESERVING BONDABILITY

[75] Inventor: Suezone Chow, Vancouver, Canada

[73] Assignee: Canadian Patents and Development Limited, Ottawa, Canada

[21] Appl. No.: 486,516

[22] Filed: Jul. 8, 1974

[30] Foreign Application Priority Data

Jul. 17, 1973 [CA] Canada .................................. 176593

[51] Int. Cl.[2] ............................................... C09J 5/04

[52] U.S. Cl. ................................ 156/316; 106/286.8; 144/309 Y; 144/317; 144/315 R; 156/319; 156/335; 427/372 R; 427/427; 427/408; 428/537; 428/538

[58] Field of Search ........................... 106/15 FP, 286; 117/138, 143 B, 150, DIG. 10; 156/319, 335, 314, 316, 310, 281, 313; 161/270, 403; 428/537, 538, 921, 541, 507, 535, 523; 423/277, 286, 283; 427/297, 427, 372 R, 325, 382, 299, 408; 21/7; 34/9.5, 13.8; 252/8.1, 385, 194; 144/309 Y, 317, 315 R

[56] References Cited

U.S. PATENT DOCUMENTS

| | | | |
|---|---|---|---|
| 1,414,609 | 5/1922 | Wheeler | 117/138 |
| 3,137,607 | 6/1964 | Goldstein et al. | 156/281 |
| 3,342,629 | 9/1967 | Martin | 428/541 |
| 3,438,847 | 4/1969 | Chase | 161/166 |
| 3,674,596 | 7/1972 | McMinimy | 156/321 |
| 3,713,943 | 1/1973 | Huff | 427/408 |
| 3,840,388 | 10/1974 | Perlus et al. | 117/59 |

FOREIGN PATENT DOCUMENTS

| | | | |
|---|---|---|---|
| 208186 | 12/1955 | Australia | 156/316 |

*Primary Examiner*—John T. Goolkasian
*Assistant Examiner*—J. J. Gallaghar
*Attorney, Agent, or Firm*—Ronald G. Bitner

[57] ABSTRACT

This invention relates to the treating of wood surfaces with a solution of selected boron compounds in order to preserve bondability during drying or storing. Effective compounds are borax and boric acid which are applied in an aqueous solution to the wood surface prior to drying or storing.

6 Claims, No Drawings

WOOD TREATMENT FOR PRESERVING BONDABILITY

BACKGROUND OF THE INVENTION

This invention relates to the treating of wood to prevent surface degradation during storage or drying and in particular to preserve bondability of the wood during high temperature drying.

It is known that during storage or drying of wood, the surface undergoes a change which adversely affects bondability of the wood with conventional adhesives. This phenomonon is commonly referred to as surface inactivation, overdrying or casehardening. In the bonding of wood in veneer or chip form into boards, the wood must be dried to a low moisture content. In industrial practice, high temperature drying is used to reduce the moisture of the wood to a desired level within the shortest possible time for economic reasons. This practice tends to increase surface inactivation or overdrying and adversely affects bondability.

Although the mechanisms of wood bonding with adhesives and the deterioration of bondability is not clearly understood, it is believed that the major reason for loss of bondability in high temperature drying is due to oxidative carboxylation and/or pyrolysis of the wood surface. A discussion on this subject with experimental data is reported by this author in "Infrared Spectral Characteristics and Surface Inactivation of Wood at High Temperatures" published in Wood Science and Technology, Vol. 5 (1971).

SUMMARY OF THE INVENTION

It is an object of the invention to provide a treatment for wood in order to preserve bondability during drying or storage.

It is a further object to preserve bondability of wood during high temperature drying.

Another object is to improve the mechanical and physical properties of bonded wood products such as bonded laminated lumber and particle board.

Another object is to provide a treatment whereby quality standards for bonded wood products can be more easily met.

It is another object to provide a treatment which also protects the wood against decay and fungal attack.

It has been found that the bondability of wood can be significantly improved by applying borax or boric acid in an aqueous solution onto the surface of the wood prior to storing or drying.

Improvements in bondability have been achieved with borax ($Na_2B_4O_7.5H_2O$) and/or boric acid ($H_3BO_3$) applied to the wood surface in amounts up to 1.6 grams (by weight of solids) per square foot in an aqueous solution. It was found that the best results are obtained with approximately 0.08 to 0.3 grams per square foot, the effectiveness decreasing both above and below this range.

DESCRIPTION OF PREFERRED EMBODIMENTS

In a preliminary experiment the boron compound ammonium pentaborate $[(NH_4)_2\ B_{10}O_{16}.8H_2O]$ was tested but found to be ineffective in preserving bondability.

The boron compound sodium borohydride, a reducing agent, is effective for preserving bondability but its high cost relative to borax or boric acid makes it economically impractical. Borax and boric acid are not reducing agents.

The bondability of wood varies from species to species, but species within the same genus can be expected to respond similarly. For the following examples three commercially important species were selected to represent difficult-to-glue genera: Spruce, Douglas-Fir and Pine.

The results in the following examples are based on standard plywood shear tests. Given are the failing shear values (psi) obtained by tension loading to failure in a Globe shear-testing machine, and the percentages of wood failure (WF).

In the following example, borax in the form borax, pentahydrate, ($Na_2B_4O_7.5H_2O$) was used.

EXAMPLE 1

This example shows the effect of borax at various concentrations on the bonding of white spruce (*Picea glauca* [Moench] Voss) veneers dried for different lengths of time. The borax ($Na_2B_4O_7.5H_2O$) was dissolved in warm water at concentrations of 1, 2.5, 5 and 10% by weight. The solution was sprayed or coated on veneer surface at a coverage of 16 grams/ft$^2$ providing a borax solids covering of 0.16, 0.4, 0.8 and 1.6 grams/ft$^2$, respectively. The one-tenth in. thick veneers, which were stored in room temperature for at least two months, were dried in a force-drafted oven at an air speed of 450 feet/minute at 180° C. for 10, 20 and 30 minutes and bonded into 3-ply plywood using phenol-formaldehyde glue, pressed at 200 psi at 150° C. for 8 minutes to ensure complete cure of the adhesive. The average results are shown in the following table.

| Drying time at 180° C | Control | | 1% | | 2.5% | | 5% | | 10% | |
|---|---|---|---|---|---|---|---|---|---|---|
| minutes | psi | WF% | psi | WF% | psi | WF% | psi | WF% | psi | WF% |
| 10 | 170 | 26 | 184 | 55 | 217 | 66 | 177 | 60 | 192 | 39 |
| 20 | 120 | 2 | 179 | 60 | 172 | 69 | 160 | 56 | 148 | 36 |
| 30 | 118 | 3 | 167 | 54 | 171 | 43 | 158 | 57 | 134 | 32 |

All specimens were treated by the vacuum-pressure soak test. Each value was obtained by averaging 10 specimens.

The results indicate that concentrations of borax up to 10%, or 1.6 grams solids/ft$^2$ improves bonding, but also shows that the efficiency of the treatment decreases with the higher concentrations. The reducing efficiency at the higher amounts may be attributable to the thickness of the applied borax preventing the contact and access of the glue to wood.

EXAMPLE 2

This example compares borax and boric acid treatments. One-tenth in. thick white spruce (*Picea glauca*) veneers prior to treatment had been stored at room temperature for more than 2 months. The veneers were sprayed with solutions of 1 and 2% by weight of borax or boric acid in water at an average of 16 grams solution per square foot. The weight of chemical solids applied being 0.16 and 0.32 gram, respectively, for 1 and 2% concentration. The veneers were then dried at 180° C. for 10, 20, 30, and 40 minutes and bonded into 3-ply plywood with phenol-formaldehyde glue. The average results are shown in the following table.

| Testing Method | Control psi | Control WF% | Borax 1% psi | Borax 1% WF% | Borax 2% psi | Borax 2% WF% | Boric acid 1% psi | Boric acid 1% WF% | Boric acid 2% psi | Boric acid 2% WF% | Borax and Boric acid 1% each psi | Borax and Boric acid 1% each WF% |
|---|---|---|---|---|---|---|---|---|---|---|---|---|
| Vacuum-pressure soak | 173 | 9 | 190 | 46 | 181 | 47 | 175 | 42 | 185 | 13 | 187 | 23 |
| Boil-dry-boil | 148 | 15 | 174 | 41 | 165 | 41 | 179 | 28 | 160 | 20 | 165 | 40 |

These results indicate that boric acid and borax and the mixture of the two can improve the bond quality.

Example 8 shows the effects of borax concentration below 1%.

EXAMPLE 3

Industrially-produced green 1/8 in. thick veneers from 56 trees of white spruce (*Picea glauca*) were obtained. From each tree, 6 sheets of veneers were selected. Three of the 6 sheets were sprayed with 1% borax solution (0.16 grams solids per square foot) and the other three were used as control. All veneers were dried in a laboratory oven at air speed of 450 ft/min at 180° C. for 30 min. The treated and non-treated veneers were separately pressed into 3-ply plywoods at 200 psi and 150° C. for 8 min. to ensure the complete cure of the phenol-formaldehyde glue. Each panel was cut into shear specimens. 10 specimens were randomly selected for vacuum-pressure soak test and 10 specimens for boil-dry-boil test. The total panels examined in this experiment were 112 with 2240 specimens.

The results are given in the following table.

| | Vacuum-pressure soak test psi | Vacuum-pressure soak test WF% | Boil-dry-boil test psi | Boil-dry-boil test WF% |
|---|---|---|---|---|
| Control | 172 | 58 | 151 | 68 |
| Borax treated | 185 | 75 | 172 | 80 |

The Canadian Standards Association (CSA-0121) and the American Society for Testing and Materials (ASTM) specifies that plywood with 80% wood failure is of acceptable quality. The severely heated control wood surface produced 58 to 68% wood failure while the treated samples showed 75–80% wood failure, approaching the acceptable level.

EXAMPLE 4

Industrially peeled one-sixth in. thick white spruce (*Picea glauca*) veneers were used. The thick veneer contained deep lathe checks due to veneer peeling. It is well known that deep lathe checks produce low shear strength in plywood. The thick veneer also requires a longer period of drying time, thus is more easily subjected to surface over-drying.

The veneers were sprayed with 1% borax solution at 0.16 grams per square foot and dried in an industrial dryer at 180° C. for 20 min. To ensure inactivation, the veneers were re-dried using the same schedule. Seven 5-ply plywoods made from both the control and treated veneers were made in an industrial press following a standard production pressing schedule using phenol-formaldehyde glue.

The results are given in the following table.

| | Vacuum-pressure soak test psi | Vacuum-pressure soak test WF% | Boil-dry-boil test psi | Boil-dry-boil test WF% |
|---|---|---|---|---|
| Control | 122 | 46 | 99 | 45 |
| Borax treated | 124 | 62 | 109 | 72 |

The non-significant improvement of strength is predictable from the lathe check effect. The improvement of average 20% absolute value of wood failure indicates the effectiveness of the borax treatment on the adhesion.

EXAMPLE 5

This example shows the effect of borax compound treatment on bond quality of plywood made of one-eighth in. thick Douglas-fir (*Pseudotsuga menziesii*) [Mirb.] Franco veneers at various chemical coverage and drying times bonded with phenol-formaldehyde glue. The pressing schedule was 150° C. for 8 min. under 200 psi pressure. Solutions of 1, 2 and 5% represent 0.16, 0.32 and 0.8 grams solids per square foot, respectively. Each value in the following table was obtained with the testing of 20 specimens from 2 panels.

| Vacuum-Pressure soak test Drying time At 180° C | Control psi | Control WF% | Borax 1% (0.16 g/ft²) psi | Borax 1% (0.16 g/ft²) WF% | Borax 2% (0.32 g/ft²) psi | Borax 2% (0.32 g/ft²) WF % | Borax 5% (0.8 g/ft²) psi | Borax 5% (0.8 g/ft²) WF% |
|---|---|---|---|---|---|---|---|---|
| 10 min. | 201 | 89 | 213 | 92 | 205 | 72 | 193 | 32 |
| 20 | 186 | 84 | 183 | 85 | 156 | 65 | 179 | 14 |
| 30 | 212 | 95 | 206 | 90 | 144 | 78 | 138 | 14 |
| 40 | 159 | 88 | 168 | 81 | 241 | 87 | 124 | 17 |
| 60 | 148 | 51 | 184 | 90 | 222 | 41 | 132 | 7 |
| 90 | 139 | 60 | 169 | 88 | 202 | 65 | 79 | 8 |

Boil-Dry-Boil test

-continued

| | | | | |
|---|---|---|---|---|
| 10 min. | 174 | 83 | 170 | 90 |
| 20 | 164 | 95 | 150 | 87 |
| 30 | 173 | 95 | 193 | 92 |
| 40 | 137 | 91 | 160 | 88 |
| 60 | 122 | 43 | 158 | 87 |
| 90 | 111 | 55 | 143 | 85 |

These results indicate that the Douglas-fir veneer dried for 40 min. at 180° C. becomes difficult to bond (Wood failure below 80% as specified by CSA Standard). However, with 1% borax solution treatment, not only the wood failure but also the strength of the plywood increased. Although the 2% borax treatment has higher strength than controls the wood failure was not different. The 5% borax solution deteriorated the bond quality which might be due to the coating effect of the borax that prevented the glue from contacting the wood.

Referring to the samples dried for 60 minutes or more, which are in the inactivated or overdried range, the effect of 1% borax solution is particularly significant in terms of the CSA and ASTM Standards requirement of 80% wood failure. The control samples failed while the treated samples easily meet the requirement.

EXAMPLE 6

This example shows the effect of boric acid and borax treatment on the bond quality of Douglas-fir (*Pseudotsuga menziesii*[Mirb.] Franco) and Lodgepole pine (*Pinus contorta* Dougl.) plywood. The one-eighth in. thick veneers were dried at 180° C. An aqueous solution of borax and boric acid were applied at 16 grams per square foot at the concentration given. The adhesive was phenol-formaldehyde glue. The following values were obtained with the average of 30 specimens taken from 3 panels using the vacuum-pressure soak test.

| Douglas-Fir | | | | | | |
|---|---|---|---|---|---|---|
| Drying Time | Control | | Borax (1%) | | Boric acid (1%) | |
| (min.) | psi | WF% | psi | WF% | psi | WF% |
| 30 | 159 | 80 | 220 | 82 | 181 | 84 |
| 50 | 159 | 69 | 214 | 85 | 211 | 75 |

| Pine | | | | | | | | | | |
|---|---|---|---|---|---|---|---|---|---|---|
| Drying | | | Borax | | | | Boric acid | | | |
| Time | Control | | 1% | | 5% | | 1% | | 5% | |
| (min.) | psi | WF% | psi | WF% | psi | WF% | psi | WF% | psi | WF% |
| 30 | 261 | 52 | 279 | 85 | 224 | 39 | 247 | 88 | 177 | 51 |
| 50 | 243 | 63 | 230 | 86 | 85 | 4 | 299 | 52 | 141 | 37 |

The results indicate that low concentrations of boric acid as well as borax are effective for improving the bond quality of plywood of Douglas-Fir and Pine.

EXAMPLE 7

This example shows the effect of borax and boric acid treatment on three wood species bonded with urea-formaldehyde glue. Urea-formaldehyde glue is the most common interior type wood adhesive and is highly sensitive to wood surface inactivation. Borax and boric acid concentrations of 1% were applied at 0.16 grams solids per square foot. The 3-ply plywood was pressed at 120° C. for 8 min. under 180 psi pressure. Each value given is the average of 30 specimens taken from 3 panels.

Spruce (*Picea glauca*)

One-eighth in. thick veneers were dried for 30 minutes at the various temperatures indicated. "V.P." indicates vacuum pressure soak test.

| Tree 1 | | | | | | | |
|---|---|---|---|---|---|---|---|
| | | Strength (psi) | | | Wood Failure (%) | | |
| Drying Temp. | Testing Method | Control | Borax | Boric Acid | Control | Borax | Boric Acid |
| 160 | Dry | 153 | 193 | 179 | 26 | 65 | 71 |
| | V.P. | 118 | 227 | 183 | 36 | 78 | 70 |
| 180 | Dry | 150 | 194 | 98 | 27 | 83 | 49 |
| | V.P. | 100 | 217 | 98 | 22 | 81 | 57 |
| 200 | Dry | 118 | 170 | 148 | 31 | 82 | 51 |
| | V.P. | 97 | 126 | 134 | 40 | 88 | 67 |
| Tree 2 | | | | | | | |
| 160 | Dry | 226 | 186 | 209 | 32 | 59 | 49 |
| | V.P. | 183 | 167 | 160 | 39 | 54 | 59 |
| 180 | Dry | 141 | 220 | 154 | 27 | 84 | 38 |
| | V.P. | 104 | 193 | 144 | 29 | 69 | 36 |
| 200 | Dry | 126 | 160 | 167 | 33 | 65 | 63 |
| | V.P. | 83 | 147 | 154 | 31 | 89 | 90 |

Douglas-Fir (*Pseudotsuga mensiesii*)

One-tenth in. thick veneers were dried at 180° C. for 30 minutes. The results of the vacuum-pressure soak test are shown below.

| | Control | | Borax (1%) | | Boric acid (1%) | |
|---|---|---|---|---|---|---|
| Panel No. | psi | WF% | psi | WF% | psi | WF% |
| 1 | 162 | 26 | 212 | 71 | 118 | 35 |
| 2 | 126 | 14 | 194 | 33 | 132 | 42 |
| 3 | 160 | 31 | 210 | 45 | 109 | 25 |
| Average | 149 | 24 | 205 | 50 | 120 | 34 |

Although the drying time of 30 minutes tended to be too severe for the one-tenth in. thick veneer drying, the treatment, especially the borax solution treatment enhanced the bond quality greatly.

Pine (*Pinus contorta*)

The one-eighth in. thick veneers were dried at 180° C. for 30 minutes. The average bond quality of the pine plywood were as follows:

| Panel No. | Control psi | Control WF% | Borax (1%) psi | Borax (1%) WF% | Boric acid (1%) psi | Boric acid (1%) WF% |
|---|---|---|---|---|---|---|
| 1 | 133 | 32 | 229 | 78 | 200 | 32 |
| 2 | 157 | 15 | 138 | 36 | 115 | 17 |
| Average | 145 | 24 | 184 | 57 | 158 | 25 |

EXAMPLE 8

This example shows the effect of low concentration of borax on bond quality. One-eighth in. thick white spruce (*Picea glauca*) veneers were dried at 180° C. for 30 minutes after being sprayed with an aqueous solution of borax. An Urea-formaldehyde glue was used as adhesive. The 3-ply plywood was pressed under 200 psi at 120° C. for 8 min. The following table shows the average value of 30 specimens taken from three panels using the vacuum-pressure soak test.

| | Borax Concentration | | | | |
|---|---|---|---|---|---|
| % | 0 | 0.2 | 0.5 | 0.8 | 1.0 |
| g/ft$^2$ | 0 | 0.32 | 0.08 | 0.128 | 0.16 |
| Shear Strength (psi) | 126 | 128 | 45 | 173 | 198 |
| Wood failure (%) | 21 | 26 | 47 | 92 | 80 |

The above examples indicate that the borax and/or boric acid treatment inproves the bondability of wood subjected to drying. The effectiveness of the treatment has been demonstrated for three difficult-to-glue tree species using both phenol-formaldehyde and urea-formaldehyde resin but this invention is not to be limited by these examples. For example, although the examples show only the bonding of veneer, the present invention may also be used for particleboard manufacture. The solution can be applied to the wood surface in any convenient manner. Furthermore other adhesives may be used, or phenol-formaldehyde and urea-formaldehyde resin can be modified by addition of resorcinol or melamine, for low temperature curing, for example.

Although the examples show the amount of borax and boric acid applied defined in terms of percentage concentration in water, with the solution being applied at a constant rate throughout, it will be understood that the significant factor is the amount of chemical solids applied. Improvements in bonding were obtained for concentrations up to 10%, or 1.6 grams solids per square foot. The most effective range is 0.08 to 0.3 grams solids per square foot. Borax was found to be somewhat more effective than boric acid.

What is claimed is:

1. A process for preserving the bondability of wood during storing or drying comprising applying to the surface of the wood, prior to said storing or drying, an aqueous solution containing a boron compound selected from the group consisting of borax and boric acid in quantities of up to 1.6 grams solids per square foot.

2. The process of claim 1 wherein borax and boric acid are applied in quantities from 0.08 to 0.3 grams solids per square foot.

3. The process of claim 1 wherein the wood after being heated and dryed is bonded with an adhesive containing phenol-formaldehyde or urea-formaldehyde resin.

4. The process of claim 2 wherein the wood is bonded to form laminated lumber or particleboard.

5. The process of claim 1 wherein the aqueous solution applied comprises from 0.5 to 2% solids by weight.

6. The process of claim 1 wherein the solution is applied prior to high temperature drying of the wood.

* * * * *